No. 881,841. PATENTED MAR. 10, 1908.
G. A. BAHN.
DEVICE FOR SLITTING SWEET CORN.
APPLICATION FILED JULY 17, 1907.
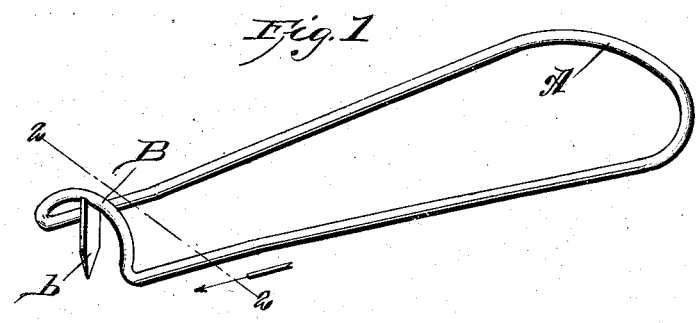
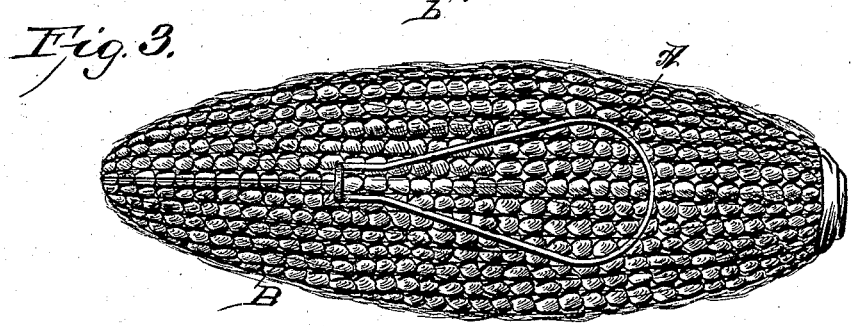
WITNESSES
INVENTOR
GUSTAVUS A. BAHN
BY
ATTORNEYS

UNITED STATES PATENT OFFICE.

GUSTAVUS A. BAHN, OF AUSTIN, TEXAS.

DEVICE FOR SLITTING SWEET CORN.

No. 881,841.  Specification of Letters Patent.  Patented March 10, 1908.

Application filed July 17, 1907. Serial No. 384,142.

*To all whom it may concern:*

Be it known that I, GUSTAVUS A. BAHN, a citizen of the United States, and a resident of Austin, in the county of Travis and State of Texas, have invented an Improved Device for Slitting Sweet Corn, of which the following is a specification.

My invention is a device for slitting the rows of grains or kernels of boiled or roasted sweet corn preparatory to eating off the cob the edible or most palatable, easily digested, and wholesome pulpy and juicy portion which is thus released from the tough, unnutritious, and indigestible fibrous covering.

The details of construction and manner of using the invention are as hereinafter described, and illustrated in the accompanying drawing, in which Figure 1 is a perspective view of the device, and Fig. 2, a cross section on line 2—2 of Fig. 1. Fig. 3 is a view illustrating the manner of applying and using the device.

The body of the device is preferably formed of wire or a metal strip, the handle portion A being an elongated loop, and the other part, or the head, B, consisting of a short transverse curve, or arch, of small radius and having a steel cutter $b$ secured to it interiorly and projecting inward, or downward, from the middle of the curve. The latter is made of sufficient width to adapt it to span one or more rows of kernels, and in using the device it is applied as in Fig. 3, so that the sides of the same, or the parts where the loop A and curve B unite, rest and slide on or between the rows of kernels adjacent to that row which is to be slit. The cutter $b$ pierces and slits the kernels successively as the device is drawn or pushed the length of the row, thus releasing the sweet, soft, pulpy, juicy, and nutritious portion of the kernels, which exudes more or less and may be readily eaten or scraped off leaving the tough, pithy, indigestible hulls adhering to the cob. The cutter $b$ is preferably sharpened on both sides to adapt it to cut in either direction.

It will be noted the sides of the loop A adjacent to the curve B serve as guides directing or keeping the cutter in the middle of a row of kernels. In place of one blade or cutter, two or more may be employed, and the arch or curve B may be multiplied to enable them to span two or more rows simultaneously.

What I claim is—

1. The improved corn-slitting device comprising a handle and a head attached thereto and having a transverse arch or curve and a cutter attached to and projecting inward from said curve, substantially as shown and described.

2. The improved corn slitting device consisting of a handle and a head connected therewith and having side portions adapted to bear upon rows of kernels, and a cutter secured to the head interiorly and arranged between the side-bearing portions, substantially as shown and described.

3. The improved corn-slitting device composed of a handle and a head formed of a metal strip, the head consisting of a transverse curve that joins the side ends of the handle and having a cutter projecting inward from the curved portion, as shown and described.

GUSTAVUS A. BAHN.

Witnesses:
M. M. JOHNSON,
JNO. H. CALDWELL.